US012742105B2

(12) United States Patent
Kamo

(10) Patent No.: US 12,742,105 B2
(45) Date of Patent: Sep. 22, 2026

(54) ADHESIVE, ROTARY ELECTRIC MACHINE, ELECTRONIC COMPONENT, AND AIRCRAFT

(71) Applicant: Mitsubishi Electric Corporation, Tokyo (JP)

(72) Inventor: Yoshiyuki Kamo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 619 days.

(21) Appl. No.: 18/269,952

(22) PCT Filed: Mar. 15, 2021

(86) PCT No.: PCT/JP2021/010324
§ 371 (c)(1),
(2) Date: Jun. 28, 2023

(87) PCT Pub. No.: WO2022/195655
PCT Pub. Date: Sep. 22, 2022

(65) Prior Publication Data

US 2023/0392057 A1 Dec. 7, 2023

(51) Int. Cl.
*C09J 163/10* (2006.01)
*C09J 11/04* (2006.01)
*C09J 11/06* (2006.01)
*C09J 11/08* (2006.01)

(52) U.S. Cl.
CPC ............ *C09J 163/10* (2013.01); *C09J 11/04* (2013.01); *C09J 11/06* (2013.01); *C09J 11/08* (2013.01)

(58) Field of Classification Search
CPC . C09J 163/10; C09J 11/08; C09J 11/04; C09J 11/06
USPC .......................................................... 524/404
See application file for complete search history.

(56) References Cited

U.S. PATENT DOCUMENTS

| | | | |
|---|---|---|---|
| 2011/0001251 | A1 | 1/2011 | Gou et al. |
| 2016/0355711 | A1 | 12/2016 | Okamoto et al. |
| 2017/0313918 | A1 | 11/2017 | Kasahara et al. |

FOREIGN PATENT DOCUMENTS

| | | | | |
|---|---|---|---|---|
| JP | 6526571 | B2 | 6/2019 | |
| JP | 6612498 | B2 | 11/2019 | |
| WO | 2009/005130 | A1 | 1/2009 | |
| WO | 2014/184859 | A1 | 11/2014 | |
| WO | WO-2018129731 | A1 * | 7/2018 | ................ C09J 5/06 |
| WO | 2017/170881 | A9 | 4/2021 | |

OTHER PUBLICATIONS

International Search Report and Written Opinion mailed on May 25, 2021, received for PCT Application PCT/JP2021/010324, filed on Mar. 15, 2021, 8 pages including English Translation.

* cited by examiner

*Primary Examiner* — Deve V Hall
(74) *Attorney, Agent, or Firm* — XSENSUS LLP

(57) ABSTRACT

A stress relaxation type adhesive is formed such that an epoxy-based base adhesive is formed with an epoxy compound having two or more allyl groups as functional groups, as a main agent, using an amine-based curing agent having a bisphenol A type resin backbone, and at least one of an ethylene-acrylic copolymer and an ethylene-propylene copolymer each having an average particle diameter of 10 μm or less is contained as a stress relaxation agent in a range of 20 wt % or less with respect to the base adhesive.

9 Claims, 9 Drawing Sheets

ADHESIVE, ROTARY ELECTRIC MACHINE, ELECTRONIC COMPONENT, AND AIRCRAFT

CROSS-REFERENCE TO RELATED APPLICATION

The present application is based on PCT filing PCT/JP2021/010324, filed Mar. 15, 2021, the entire contents of which are incorporated herein by reference.

TECHNICAL FIELD

The present disclosure relates to an adhesive, a rotary electric machine, an electronic component, and an aircraft.

BACKGROUND ART

In general, an adhesive having high heat resistance has problems such as becoming brittle when cured and not having a high adhesive force. In addition, there is a problem that when thermal stress is applied due to temperature cycles, etc., the adhesive force decreases and cracks occur, or the adhesive peels off from an adherend. Even an epoxy-based adhesive which is said to have heat resistance merely has heat resistance of about 180° C., but in recent years, those having heat resistance exceeding 200° C. have begun to be put on the market.

In contrast, an epoxy adhesive that has excellent heat resistance and that has both overlap shear adhesive strength and peeling strength has been disclosed for the purpose of use for automotive members and the like (see, for example, Patent Document 1). Furthermore, a cured product composition that has a high glass transition temperature, i.e., high heat resistance and excellent adhesion, and that is useful for adhesives has been disclosed (see, for example, Patent Document 2).

CITATION LIST

Patent Document

Patent Document 1: Japanese Patent No. 6612498
Patent Document 2: WO2017/170881

SUMMARY OF THE INVENTION

Problems to be Solved by the Invention

On the other hand, it has been considered to make electronic materials and drive components such as motors to have high-temperature heat resistance, and adhesives for bonding constituent components have also been required to have further heat resistance and stability with respect to a wide range of environmental temperature changes (temperature cycles).

In the epoxy adhesive described in Patent Document 1, an epoxy forms a base containing at least 50 mass % of a tri- or more functional liquid epoxy, and an agent having a low glass transition temperature Tg (−110 to −30° C.) is also contained as a core-shell toughening agent added as a stress relaxation agent. Therefore, the epoxy adhesive cannot be said to have a configuration of having sufficient heat resistance, and resistance to temperature cycles (thermal shock resistance) thereof is not described and is unknown.

The cured product composition described in Patent Document 2 may be said to have high heat resistance for application to optical materials, display elements, and various films for electronic components, which are the application targets described in Patent Document 2 (paragraph 0099). However, the cured product composition has a glass transition temperature Tg of about 80 to 100° C. (Tables 1 to 3) and thus cannot be said to have sufficiently high heat resistance, and resistance to temperature cycles (thermal shock resistance) thereof is not described and is unknown.

The present disclosure has been made to solve the above problems, and an object of the present disclosure is to provide a stress relaxation type adhesive having high heat resistance and also having resistance to stress during temperature cycles.

Solution to the Problems

An adhesive according to the present disclosure is an adhesive wherein an epoxy-based base adhesive is formed with an epoxy compound having two or more allyl groups as functional groups, as a main agent, using an amine-based curing agent having a bisphenol A type resin backbone, and at least one of an ethylene-acrylic copolymer and an ethylene-propylene copolymer each having an average particle diameter of 10 μm or less is contained as a stress relaxation agent in a range of 20 wt % or less with respect to the base adhesive.

Effect of the Invention

In the adhesive according to the present disclosure, in a combination of the base adhesive and the stress relaxation agent added thereto, the Young's modulus can be decreased on the low temperature side, and the glass transition temperature does not change, so that the adhesive has a configuration of having resistance so as to relax stress during temperature changes while maintaining the high heat resistance of the base adhesive, and the reliability of a bonded portion is improved by using this adhesive.

DESCRIPTION OF EMBODIMENTS

Figure 1:
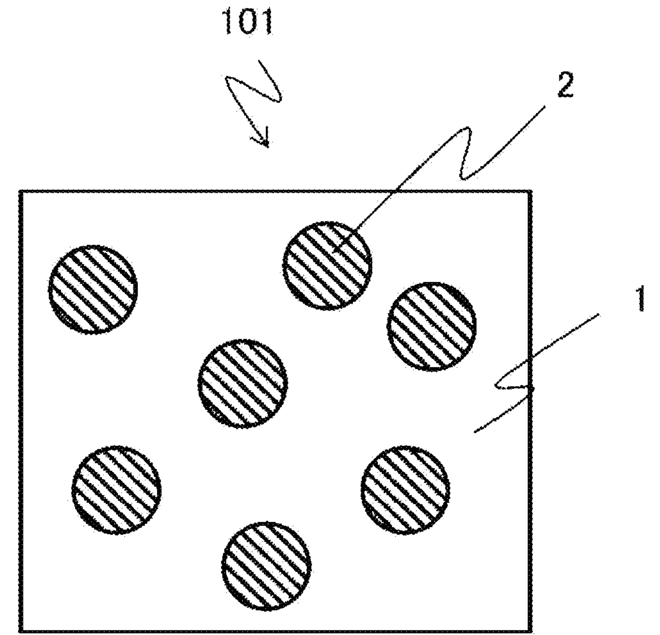
FIG. 1 is a schematic diagram showing the structure of a stress relaxation type adhesive according to Embodiment 1.

Hereinafter, embodiments will be described with reference to the drawings. In the drawings, the same reference characters denote the same or corresponding parts.

Embodiment 1

Hereinafter, an adhesive according to Embodiment 1 will be described.

[Preparation of Adhesive]

The adhesive according to Embodiment 1 is a thermosetting epoxy-based adhesive. An epoxy that is a main component is a thermosetting component, and an epoxy compound having two or more allyl groups as functional groups is used as a main agent. The main agent may be one compound or a combination of two or more compounds. As a curing agent, an amine-based curing agent having a bisphenol A type resin backbone is used. A base adhesive is composed of an adhesive containing the main agent and the curing agent. Furthermore, a stress relaxation type adhesive is formed by adding at least one of an ethylene-acrylic copolymer and an ethylene-propylene copolymer as a stress relaxation agent to an epoxy-based adhesive that is the base adhesive containing the main agent, which is the epoxy compound, and the amine-based curing agent.

Here, the ethylene-acrylic copolymer used as the stress relaxation agent is ethylene dimethacrylate, hexamethylene diacrylate, tetramethylene dimethacrylate, diethylene glycol dimethacrylate, triethylene glycol dimethacrylate, tetraethylene glycol diacrylate, 1,3-butylene glycol diacrylate, or the like.

Also, the ethylene-propylene copolymer used as the stress relaxation agent is propylene glycol diacrylate, tripropylene glycol diacrylate, 2-hydroxypropyl methacrylate, dipropylene glycol diacrylate, tripropylene diacrylate, or the like.

The melting points of these materials used as the stress relaxation agent are characterized as being about 40 to 100° C.

Table 1 below shows an example of the adhesive according to Embodiment 1. The adhesive was created by: forming an epoxy-based base adhesive with 4,4'-isopropylidene diphenol and p-phenylene dicyanate, which are two types of epoxy compounds having two or more allyl groups as functional groups, as a main agent, using N,N-bis(2,3-epoxypropyl)-4-(2,3-epoxypropoxy)aniline, which is an amine-based curing agent having a bisphenol A type resin backbone, as an additive; adding three stress relaxation agents including triethylene glycol dimethacrylate, which is an ethylene-acrylic copolymer, in a range of less than 20 wt %; adding amorphous silica as a viscosity adjustment and adhesive film thickness adjustment material in a range of less than 5 wt %; and performing adjustment such that the total amount of all ingredients becomes 100 wt %. The main agent, the additive, the curing agent, etc., are examples, and such ingredients are not limited thereto. For example, the main agent may be any epoxy compound having two or more allyl groups as functional groups.

TABLE 1

| Component | Purpose | Addition amount (wt %) | Material example |
|---|---|---|---|
| Main agent | Highly heat-resistant bonding | 10 to 20 | 4,4'-isopropylidene diphenol |
| | | 5 to 10 | 1-chloro-2,3-epoxypropane |
| | | 10 to 20 | Bisphenol A epoxy |
| | | 10 to 20 | p-phenylene dicyanate |
| Additive | | 10 to 15 | 1,2-epoxybutane |
| | | 15 to 20 | Isopropyl glycidyl ethyl |
| Curing agent | | 15 to 25 | N,N-bis(2,3-epoxypropyl)-4-(2,3-epoxypropoxy)aniline |
| Other components | Viscosity adjustment and film thickness adjustment | <5 | Amorphous silica ($SiO_2$) |
| | Stress relaxation agent | <20 | Triethylene glycol dimethacrylate<br>Methyl methacrylate<br>2,2'-azobisisobutyronitrile |

FIG. 1 shows a schematic diagram showing the structure of the stress relaxation type adhesive according to Embodiment 1. A stress relaxation type adhesive 101 after being adjusted and cured has a structure in which a stress relaxation agent 2 is dispersed in an epoxy-based base adhesive 1 as shown in FIG. 1.

[Preparation of Shear Test Piece]

Next, a shear strength test piece was prepared for evaluating adhesive strength.

Figure 2:
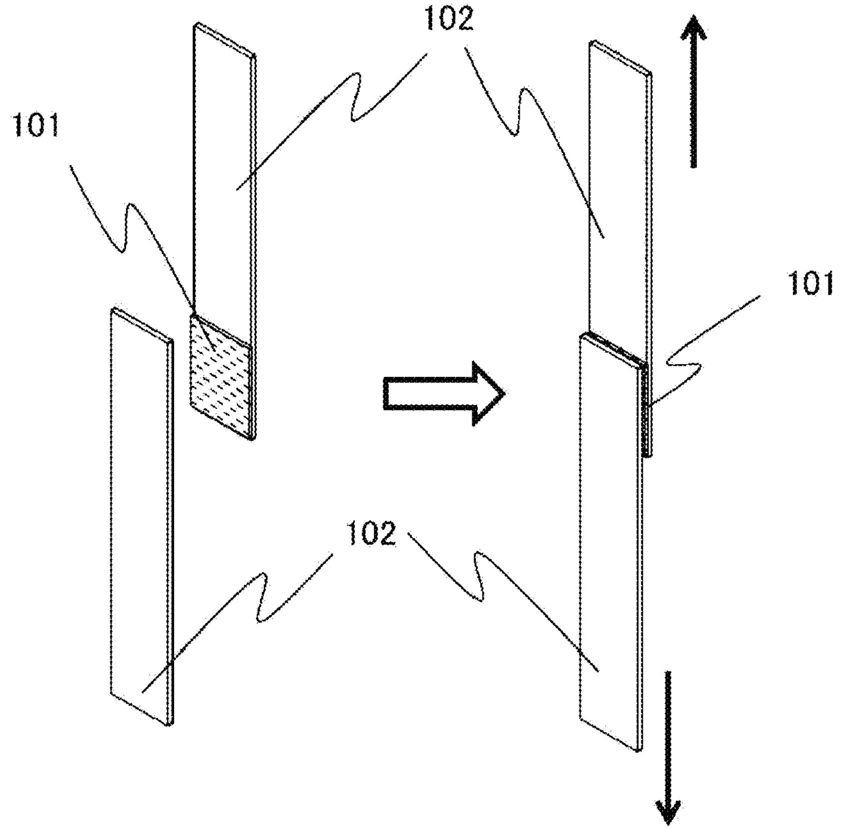
FIG. 2 is a diagram illustrating a method for evaluating the adhesive strength of the stress relaxation type adhesive according to Embodiment 1.

FIG. 2 shows a method for preparing a shear test piece and a shear test. The test piece is composed of a pair of SPCC plates 102 (steel plates). The stress relaxation type adhesive 101 is applied to an end portion of one surface of one SPCC plate 102 and sandwiched between the two SPCC plates 102. This test piece is cured at 160 to 200° C., and then the shear test is performed for evaluation of adhesive strength by pulling the test piece up and down as shown in FIG. 2.

In the preparation of this test piece for evaluating adhesive strength, physical treatment such as atmospheric plasma treatment, deep ultraviolet light treatment, corona discharge treatment, and roughening treatment (laser roughening, grinding, sandblasting) is performed as surface treatment of the SPCC plates 102 which are the test piece, whereby improvement of adhesion or adhesive strength can be expected. In addition, as chemical treatment, a silane coupling agent is applied as a primer, whereby the same effect can also be obtained. For example, for the epoxy-based adhesive, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, N-2-(aminoethyl)-3-aminopropylmethyldimethoxysilane, 3-aminopropyltrimethoxysilane, 3-triethoxysilyl-N-(1, 3-dimethyl-butylidene)propylamine, N-phenyl-3-aminopropyltrimethoxysilane, N-(vinylbenzyl)-2-aminoethyl-3-aminopropyltrimethoxysilane hydrochloride, etc., may be used as the primer.

[Adhesive Strength Evaluation 1]

The stress relaxation agent exists so as to be dispersed in the stress relaxation type adhesive 101 as shown in FIG. 1, and the stress relaxation agent can be used if the stress relaxation agent has an average particle diameter of 50 μm or less. When the average particle diameter is reduced to several micrometers which is equal to or less than 10 μm, the adhesive strength is improved. That is, the average particle diameter is preferably in a range of not less than 1 μm and not greater than 10 μm.

Figure 3:
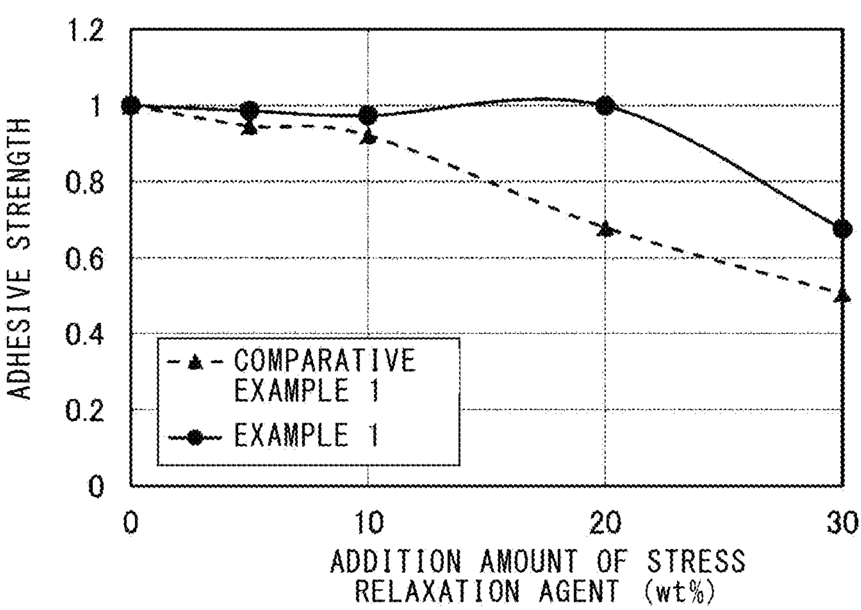
FIG. 3 is a diagram showing a relationship between an addition amount of a stress relaxation agent and the adhesive strength of the stress relaxation type adhesive according to Embodiment 1.

FIG. 3 is a diagram showing a relationship between an addition amount of the stress relaxation agent and adhesive strength. The conditions for Comparative Example 1 and Example 1 are as follows. The pretreatment conditions are the same.

Comparative Example 1

- Test piece: SPCC/SPCC
- Pretreatment of test piece: acetone degreasing, grinding with No. 400 buffing wheel
- Thickness of adhesive: 80 to 100 μm
- Adhesive:
  - Main agent bisphenol A type epoxy
  - Curing agent polyamidoamine
  - Stress relaxation agent urethane-based agent Example 1

- Test piece: SPCC/SPCC
- Pretreatment of test piece: acetone degreasing, grinding with No. 400 buffing wheel
- Thickness of adhesive: 80 to 100 μm
- Adhesive:
  - Main agent epoxy compound having two allyl groups as functional groups
  - Curing agent amine-based agent having bisphenol A type resin backbone
  - Stress relaxation agent ethylene-acrylic copolymer
  - Average particle diameter of stress relaxation agent 10 μm FIG. 3 shows changes in adhesive strength when adhesive strength obtained when no stress relaxation agent is added is regarded as 1. In the figure, the stress relaxation type adhesive according to Example 1 is indicated by a solid line, and when the addition amount of the stress relaxation agent was increased, no decrease in strength was observed until the addition concentration reached 20 wt %. On the other hand, for the adhesive according to Comparative Example 1, the strength gradually decreased with the addition of the stress relaxation agent, and the strength decreased significantly when the addition concentration exceeded 10 wt %. The adhesive strength of the epoxy-based adhesive before the addition of the stress relaxation agent (base adhesive, corresponding to 0 wt % of the stress relaxation agent in FIG. 3) in Example 1 is 16 to 18 MPa in the above-described shear test.

Next, a breakage mode after the shear test of the test piece of Example 1 was checked.

Figure 4A:
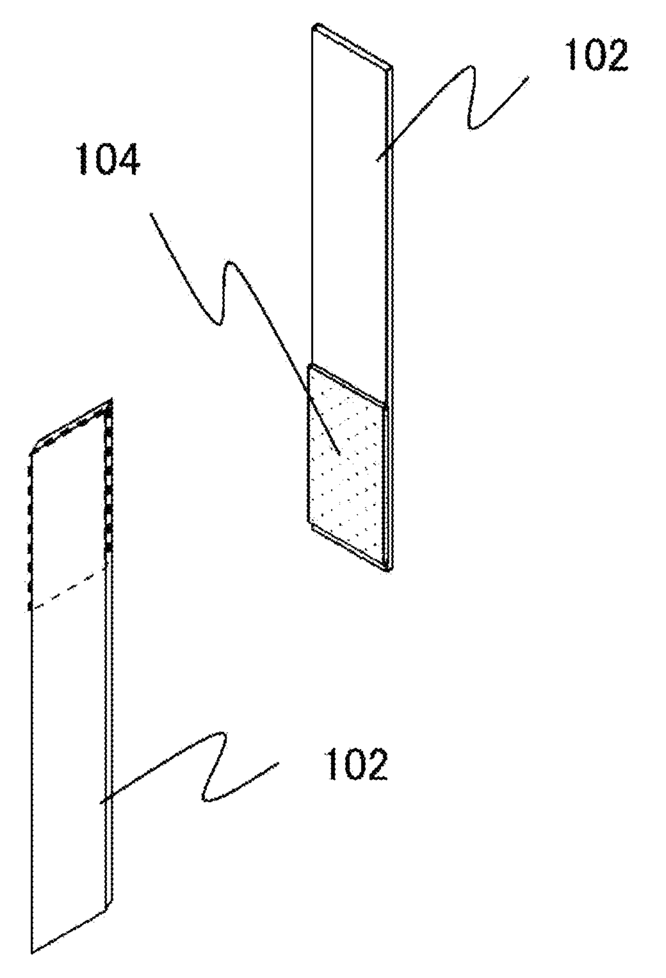
FIG. 4A is a schematic diagram showing a breakage mode after a shear test in FIG. 2.
Figure 4B:
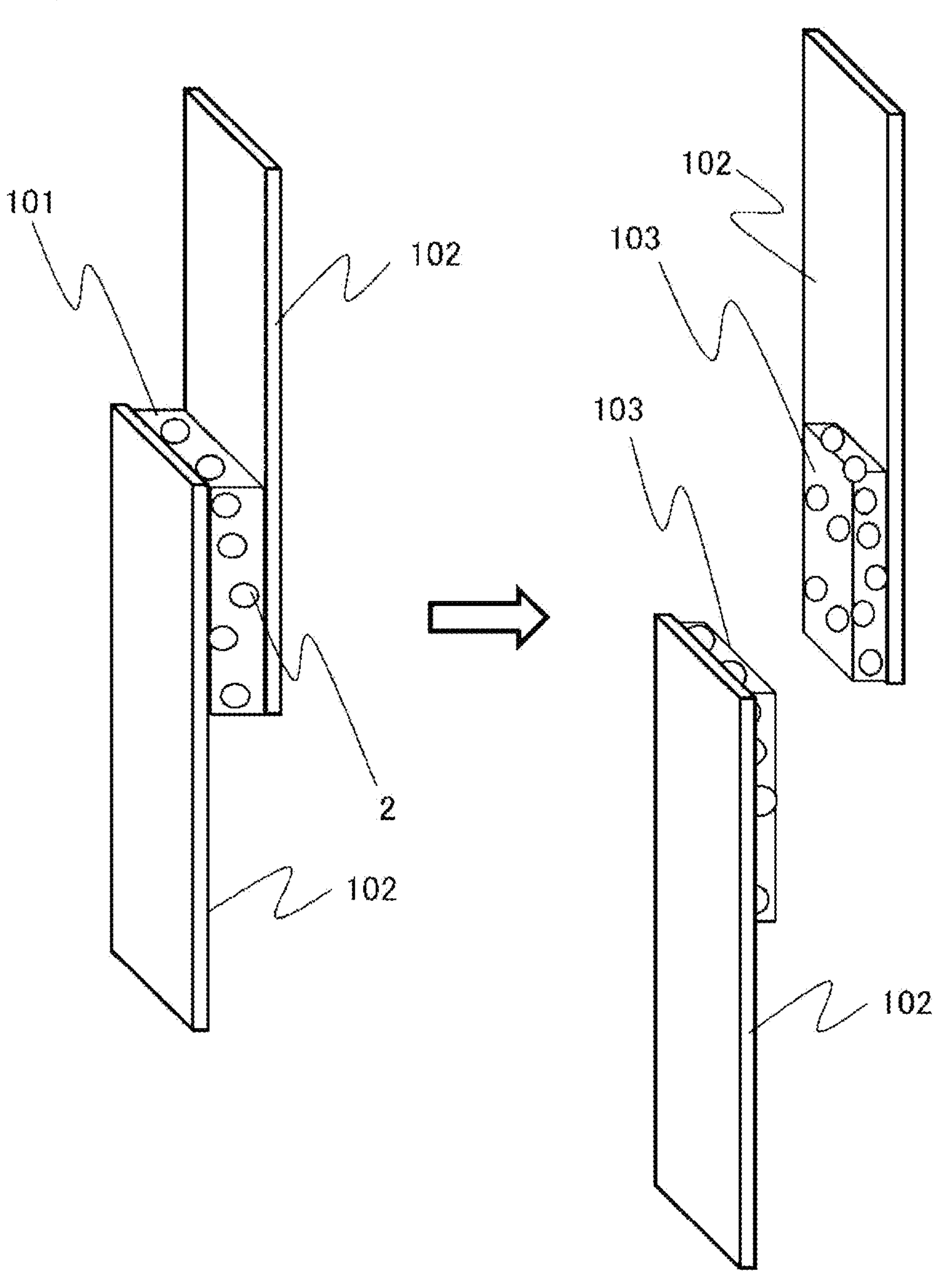
FIG. 4B is a schematic diagram showing another breakage mode after the shear test in FIG. 2.

FIG. 4A and FIG. 4B are schematic diagrams for describing the breakage mode of the adhesive after the shear test. FIG. 4A shows an interface peeling mode 104 in which the adhesive remains on one SPCC plate 102 of the test piece and peels off at the interface between the other SPCC plate 102 of the test piece and the adhesive. FIG. 4B shows states before and after the test of the adhesive according to the present embodiment to which the stress relaxation agent 2 is added. FIG. 4B shows a cohesive failure mode 103 in which the adhesive is broken therein and remains on both SPCC plates 102 which are the test piece.

In Example 1 in FIG. 3, the breakage mode after the test was interface peeling when the addition amount of the stress relaxation agent was 0, but it was confirmed that as the stress relaxation agent was added, the percentage of cohesive failure increased and the breakage mode changed. When the addition concentration of the stress relaxation agent was 20 wt %, the breakage mode was almost cohesive failure. This indicates that at an addition concentration of wt % or less, a stress relaxation effect is exhibited without decreasing adhesive strength and cohesive failure occurs. From the observation results of the breakage mode and FIG. 3, it is found that the addition concentration of the stress relaxation agent is preferably 10 to 20 wt %, which is effective in stress relaxation.

The epoxy-based adhesive (base adhesive) before adding the stress relaxation agent in Example 1 described above is a highly heat-resistant epoxy-based adhesive having an adhesive strength of 16 to 18 MPa after curing and having a physical property of a glass transition temperature of 200° C. or higher. According to FIG. 3, it is found that the stress relaxation type adhesive of Example 1 is a useful stress relaxation type adhesive whose adhesive strength does not decrease up to an addition concentration of 20 wt % and is maintained at 10 MPa even at an addition concentration of 30 wt %.

Example 1 is an example in which the number of stress relaxation agents to be added is one, but two or more stress relaxation agents may be added simultaneously if these stress relaxation agents are of the same type. As the average particle diameter (size) of the stress relaxation agent to be added becomes smaller, the stress relaxation agent is more finely dispersed in the entire adhesive, and the stress relaxation effect is more enhanced. If the addition amount is the same, the cohesive failure property is increased as the average particle diameter of the stress relaxation agent to be added is decreased.

[Adhesive Strength Evaluation 2]

Next, different types of adhesives before adding the stress relaxation agent were prepared, and the effect of the stress relaxation agent according to Embodiment 1 was checked.

The base adhesives and the stress relaxation agents used are as follows.

Figure 5:
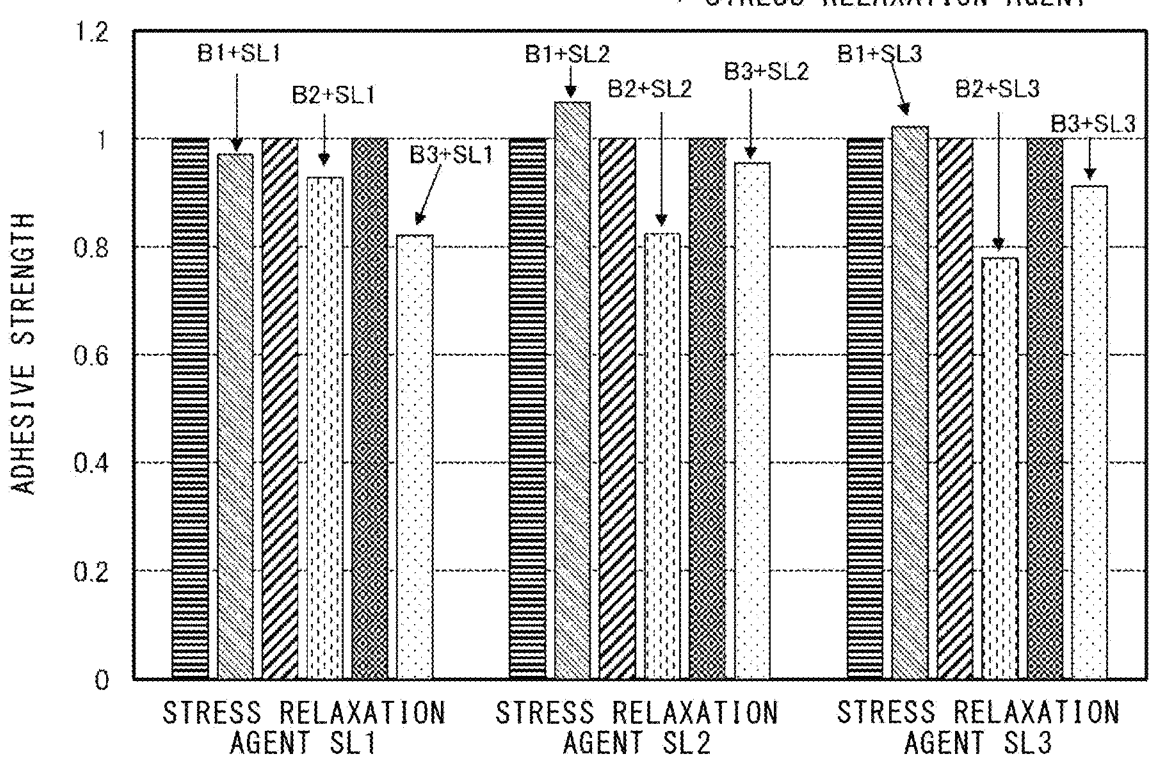
FIG. 5 is a diagram showing changes in adhesive strength when different stress relaxation agents are added to three types of base adhesives.

Base adhesive B1: highly heat-resistant epoxy-based adhesive
Main agent epoxy compound having two allyl groups as functional groups
Curing agent amine-based agent having bisphenol A type resin backbone
Base adhesive B2: one-component thermosetting epoxy-based adhesive
TB2237J manufactured Threebond Fine Chemical Co., Ltd.
Base adhesive B3: two-component acrylic-based adhesive
Y612Black manufactured by CEMEDINE CO., LTD.
Stress relaxation agent SL1: urethane-based agent
Stress relaxation agent SL2: ethylene-acrylic copolymer
Stress relaxation agent SL3: ethylene-propylene copolymer FIG. 5 shows changes in adhesive strength before and after each stress relaxation agent (SL1, SL2, SL3) is added at 10 wt % to each base adhesive (B1, B2, B3).

In the figure, six bars on the left indicate the cases with the addition of the urethane-based stress relaxation agent SL1 as comparative examples, and the adhesive strength is decreased after the addition to each of the base adhesives.

In the figure, six bars at the center indicate the cases with the addition of the stress relaxation agent SL2 which is an ethylene-acrylic copolymer and is an example of the present embodiment. When the stress relaxation agent SL2 was added to the highly heat-resistant epoxy-based adhesive which is the base adhesive B1 according to the present embodiment, the adhesive strength was slightly improved, but when the stress relaxation agent SL2 was added to the other base adhesives B2 and B3 which are comparative examples, the adhesive strength decreased.

In the figure, six bars on the right indicate the cases with the addition of the stress relaxation agent SL3 which is an ethylene-propylene copolymer and is an example of the present embodiment. When the stress relaxation agent SL3 was added to the highly heat-resistant epoxy-based adhesive which is the base adhesive B1 according to the present embodiment, the adhesive strength was slightly improved, but when the stress relaxation agent SL3 was added to the other base adhesives B2 and B3 which are comparative examples, the adhesive strength decreased.

From the above, it is found that a combination of the highly heat-resistant epoxy-based adhesive which is the base adhesive according to Embodiment 1 and at least one of the stress relaxation agent that is the ethylene-acrylic copolymer according to Embodiment 1 and the stress relaxation agent that is the ethylene-propylene copolymer according to Embodiment 1, added thereto, is a good combination.

[Change in Glass Transition Temperature]

Next, change in glass transition temperature due to the addition of the stress relaxation agent will be described. A glass transition temperature Tg is a physical property value that serves as an indicator of heat resistance. In general, stress relaxation agents are soft materials and have low glass transition temperatures. Therefore, when a stress relaxation agent is added to a base adhesive, the glass transition temperature of the adhesive decreases in accordance with the addition amount of the stress relaxation agent.

In the combination of the base adhesive and the stress relaxation agent according to Embodiment 1, a dynamic viscoelasticity test (DMA: Dynamic Mechanical Analysis) was performed in an addition concentration range where the adhesive strength does not decrease even when the above-described stress relaxation agent is added. Here, a combination of the base adhesive B1 and the stress relaxation agent SL2 was evaluated. As the measurement results, the temperature dependence of tan δ (loss tangent) and the temperature dependence of a Young's modulus (E') are shown below.

Figure 6:
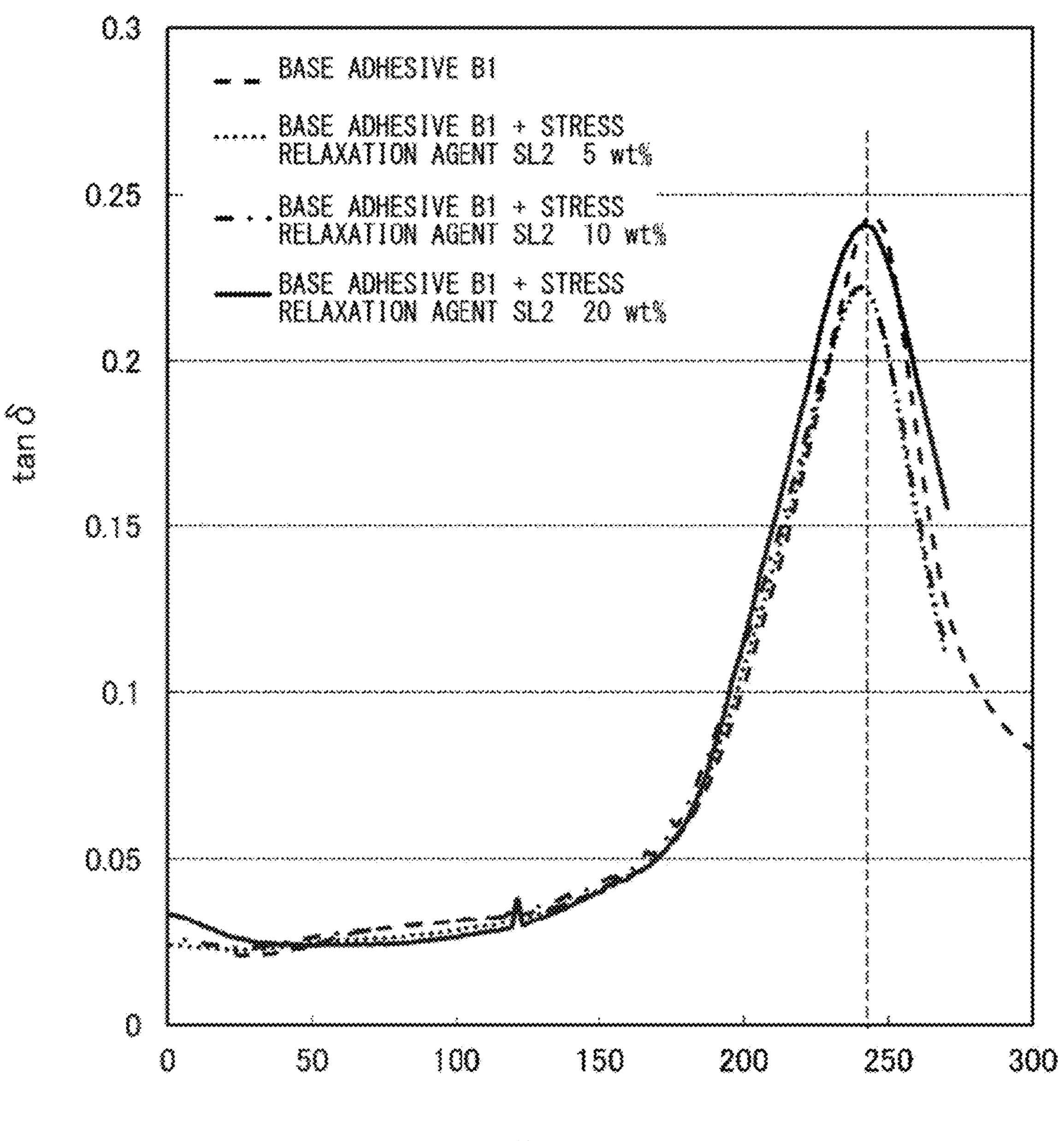
FIG. 6 is a diagram showing the temperature dependence of tan δ when the addition amount of the stress relaxation agent is varied in the stress relaxation type adhesive according to Embodiment 1.

FIG. 6 shows a tan δ curve indicating the temperature dependence of tan δ when the addition amount of the stress relaxation agent SL2 was varied in the base adhesive B1, wherein the horizontal axis indicates temperature and the vertical axis indicates tan δ. In FIG. 6, from the tan δ peak, the glass transition temperature was about 240° C. for the base adhesive B1 and for the base adhesive B1 with the stress relaxation agent SL2 added up to 20 wt % thereto, and no change was observed even when the stress relaxation agent SL2 having a glass transition temperature of 40 to 100° C. which is lower than that of the base adhesive was added.

In other words, it is found that in the combination of the base adhesive and the stress relaxation agent according to Embodiment 1, the high heat resistance of the base adhesive is maintained even when the stress relaxation agent is added in the range where the adhesive strength does not decrease.

[Change in Young's Modulus]

Figure 7:
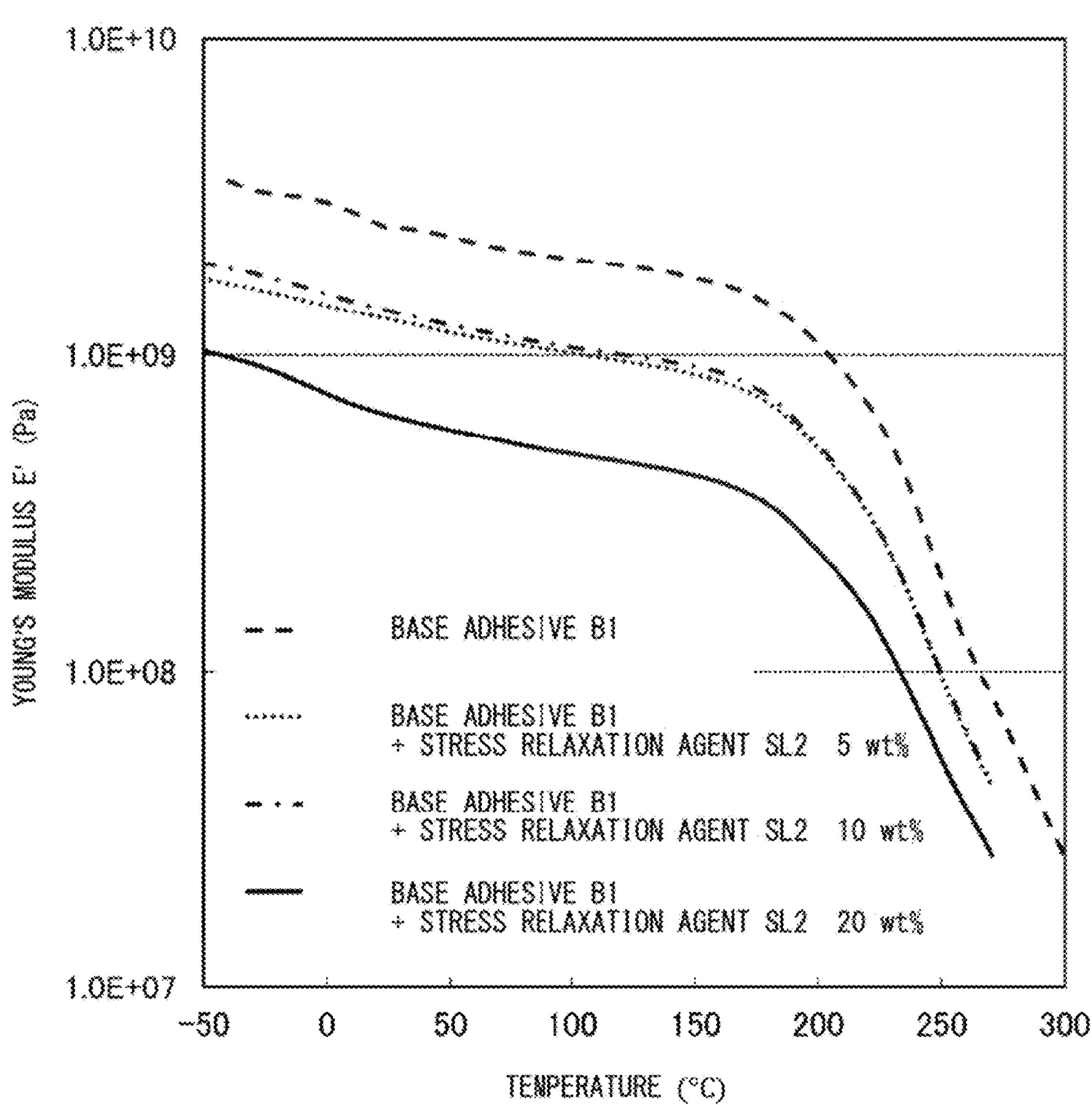
FIG. 7 is a diagram showing the temperature dependence of a Young's modulus when the addition amount of the stress relaxation agent was varied in the stress relaxation type adhesive according to Embodiment 1.

FIG. 7 is a diagram showing the temperature dependence of a Young's modulus when the addition amount of the stress relaxation agent SL2 was varied in the base adhesive B1. In FIG. 7, when the stress relaxation agent SL2 is added to the base adhesive B1, the Young's modulus decreases in accordance with the addition amount. In particular, at 150° C. or lower, it is possible to decrease the Young's modulus from several GPa to 1 GPa or less, that is, about ⅕, when 20 wt % of the stress relaxation agent SL2 is added. The decrease in Young's modulus in a low temperature range means that the adhesive can achieve relaxation of stress during thermal curing and is resistant enough to be used in environments having large temperature differences.

Figure 8:
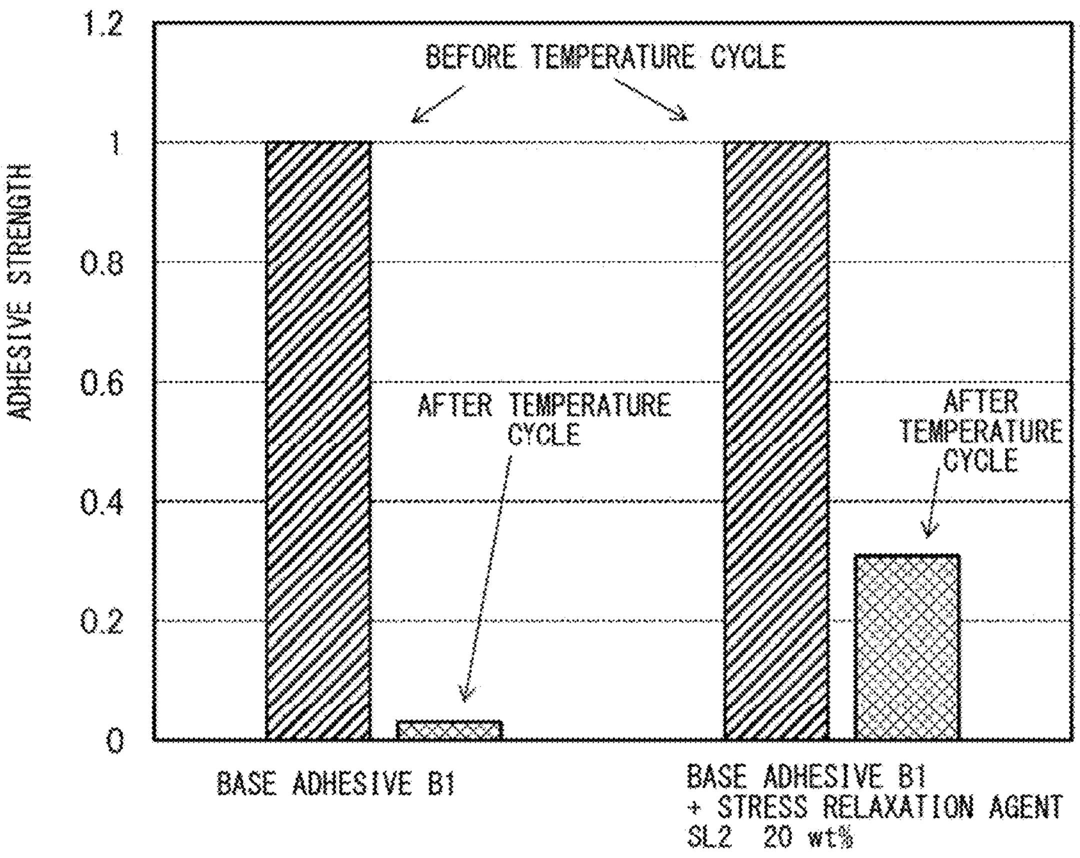
FIG. 8 is a diagram showing changes in adhesive strength before and after a temperature cycle test of the stress relaxation type adhesive according to Embodiment 1.

FIG. 8 is a diagram showing changes in adhesive strength before and after a temperature cycle test for the base adhesive B1 and for the base adhesive B1 with the stress relaxation agent SL2 added at 20 wt % thereto. Here, the temperature cycle test was performed for 100 cycles in the range of −10° C. to 130° C. In addition, for each adhesive strength, a change is shown with the adhesive strength before the test being regarded as 1. When the stress relaxation agent SL2 is added at 20 wt %, the decrease in adhesive strength after the temperature cycle test is reduced, so that it is found that resistance to stress during temperature cycles is also exhibited. In addition, the cohesive failure mode is maintained after the temperature cycle test of the stress relaxation type adhesive to which the stress relaxation agent SL2 is added at 20 wt %, so that improvement of reliability can be expected.

As described above, according to Embodiment 1, an epoxy-based base adhesive is formed with the epoxy compound having two or more allyl groups as functional groups, as a main agent, using the amine-based curing agent having a bisphenol A type resin backbone, and at least one of the ethylene-acrylic copolymer and the ethylene-propylene copolymer each having an average particle diameter of several micrometers which is equal to or less than 10 μm is added as a stress relaxation agent in the range of 20 wt % or less to the base adhesive. Therefore, it becomes possible to provide a stress relaxation type adhesive that has resistance to temperature cycles by decreasing a Young's modulus while maintaining the high heat resistance and the adhesive strength of the epoxy-based base adhesive having a glass transition temperature of 200° C. or higher.

Embodiment 2

Hereinafter, an adhesive according to Embodiment 2 will be described.

[Adjustment of Viscosity]

The viscosity of the stress relaxation type adhesive according to Embodiment 1 described above can be adjusted by controlling the particle diameter of the stress relaxation agent to be added to be in the range of 1 μm to 10 μm, and an adhesive having a viscosity of 3 Pas to 300 Pas can be obtained. If the viscosity is in this range, a level of viscosity at which the adhesive does not drop when applied to a wall surface can be maintained. In addition, the viscosity may be adjusted; for example, the viscosity is decreased in the case where the adhesive is used by being injected into a narrow gap. At this time, as the particle diameter is smaller, it is possible to produce an adhesive having higher thixotropy.

The viscosity of the adhesive can be adjusted not only by the particle diameter of the stress relaxation agent, but also by the material of the main agent of the base adhesive, the type and particle diameter of the stress relaxation agent, whether and how to perform surface treatment when the adhesive is applied to an adherend, etc. Furthermore, the viscosity of the adhesive may be adjusted by adding a filler.

[Addition of Filler]

In order to adjust the viscosity to be in the range of 3 Pas to 300 Pas, one selected from among glass such as fused silica, amorphous silica, and hollow glass, mineral species composed of silicates such as mica and talc, engineering polymer materials such as polyethylene and polypropylene, etc., may be used as a filler. The filler may be selected from among them according to the cost and purpose such as weight reduction.

For example, in the case of application to an electronic component such as a semiconductor, fused silica is added as the filler in order to ensure insulation. To improve thermal conductivity, powder (scale-like, spherical, needle-like, and special shapes) of boron nitride (BN), aluminum oxide ($Al_2O_3$), aluminum nitride (AlN), silver (Ag), or the like having high thermal conductivity may be added as the filler. By adjusting the addition amount of the filler, it is possible to produce an adhesive to which a target thermal conductivity is imparted. In addition, to improve an electrical conductivity, silver or carbon (C) material may be added.

For example, the thermal conductivity of the stress relaxation type adhesive according to Embodiment 1 to which no filler is added is about 0.2 W/k·m, but it was confirmed that it was possible to improve the thermal conductivity to about 100 W/k·m by adding silver powder as the filler.

The addition amounts of these fillers each depend on the purpose thereof, but by adding the filler in the range of 20 to 85 wt % to the base adhesive, the purpose can be achieved, and the effect of the filler can be exhibited.

Also, the thickness of the adhesive after curing can be controlled by the size of the filler to be added. In this case, a material having a largest particle diameter among materials that are not crushed when bonded may be added.

Figure 9:
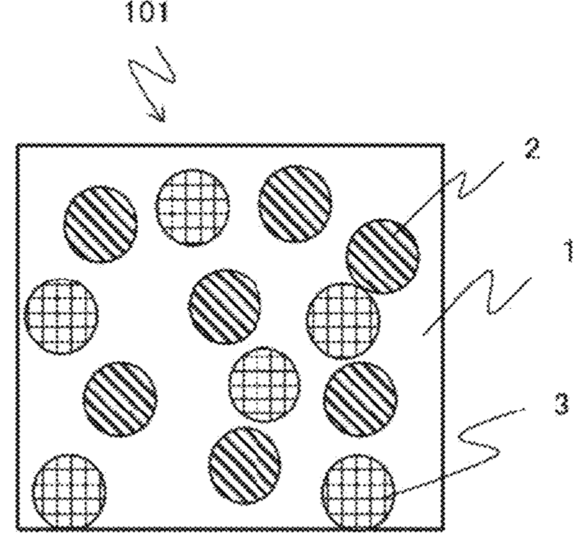
FIG. 9 is a schematic diagram showing the structure of a stress relaxation type adhesive according to Embodiment 2.

FIG. 9 is a schematic diagram showing the structure of a stress relaxation type adhesive 101 according to Embodiment 2. The stress relaxation type adhesive 101 after being adjusted and cured has a structure in which a stress relaxation agent 2 and a filler 3 are dispersed in an epoxy-based base adhesive 1 as shown in FIG. 9. Here, the filler 3 to be added to the adhesive 1 may be subjected to surface treatment in order to improve the adhesion between the adhesive 1 and the filler 3. Specifically, a silane coupling agent, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidyloxypropyltrimethoxysilane, and 3-glycidoxypropyltriethoxysilane, is used.

As described above, according to Embodiment 2, in addition to the same effects as those of Embodiment 1, it is possible adjust the viscosity of the stress relaxation type adhesive since the filler is added to the stress relaxation type adhesive. In addition, by adjusting the type and amount of the filler to be added, it is possible to improve the function of the adhesive according to the purpose of the adhesive.

In the above embodiment, it is indicated that the filler may be selected from among glass, mineral species composed of silicates, engineering polymer materials, ceramics, silver, and carbon, but a plurality of fillers may be selected. That is, at least one filler may be selected from among glass, mineral species composed of silicates, engineering polymer materials, ceramics, silver, and carbon.

Embodiment 3

Hereinafter, a rotary electric machine according to Embodiment 3 will be described with reference to the drawings. In the rotary electric machine according to Embodiment 3, the stress relaxation type adhesive described in Embodiment 1 or 2 above is used for bonding members included in the rotary electric machine.

Figure 10A:
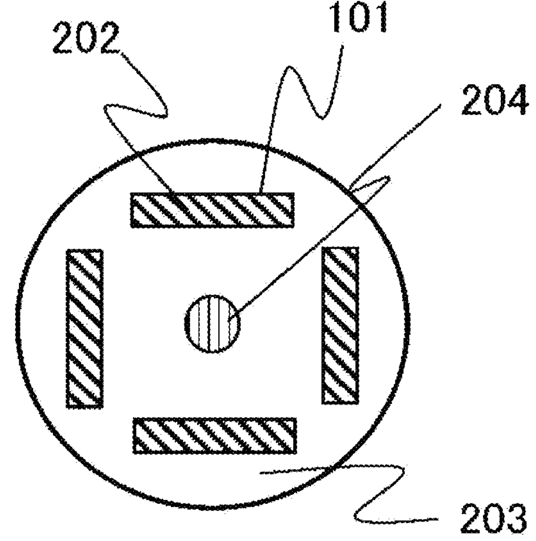
FIG. 10A is a partial cross-sectional view showing the structure of an IPM motor which is an example of a rotary electric machine according to Embodiment 3.
Figure 10B:
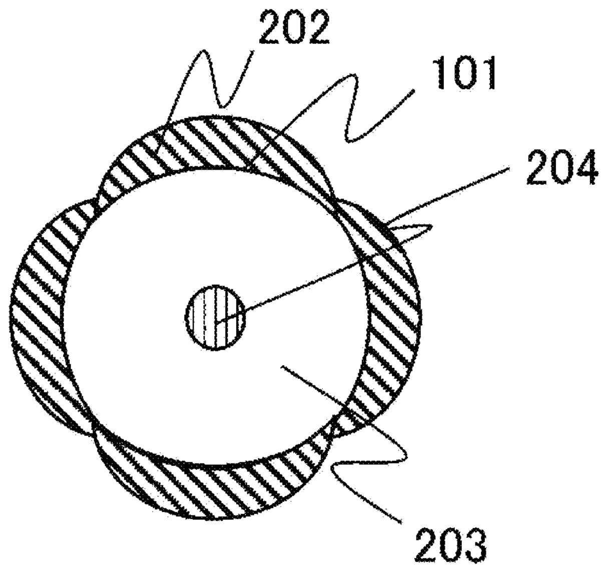
FIG. 10B is a partial cross-sectional view showing the structure of a SPM motor which is an example of the rotary electric machine according to Embodiment 3.

As an example of application to a rotary electric machine, FIG. 10A shows an IPM (Inter Permanent Magnet) motor, and FIG. 10B shows a SPM (Surface Permanent Magnet) motor. Each diagram is a partial cross-sectional view in an axial direction, and magnets 202 are bonded to a rotor core 203 having a shaft 204 as a rotary shaft, using the stress relaxation type adhesive 101. Each magnet 202 used here may be any of a ferrite magnet, a neodymium magnet, a samarium cobalt magnet, an alnico magnet, a bond magnet, etc., regardless of the alloy composition thereof. The magnets 202 are bonded to the rotor core 203, and are each composed of, for example, a die-cast molded article or an electromagnetic steel sheet in which thin iron plates are stacked.

The IPM motor in FIG. 10A has a configuration in which the magnets 202 are embedded in the rotor core 203, the SPM motor in FIG. 10B has a configuration in which the magnets 202 are bonded to the periphery of the rotor core 203, and the required adhesive strength, viscosity, etc., are different. However, it is sufficient if the magnets 202 are bonded using the stress relaxation type adhesive 101 described in Embodiment 1 or 2 above.

In the case where the motor whose components are bonded using the stress relaxation type adhesive 101 as described above is used for an automobile, the adhesive strength of the stress relaxation type adhesive 101 does not decrease even in an environment having severe temperature changes, such as an engine room, so that it is possible to maintain the reliability of the motor. In addition, since the physical properties can be adjusted simply by adjusting the filler to be added, the same base adhesive or the same base adhesive with the stress relaxation agent added thereto can be used.

Embodiment 4

Hereinafter, an electronic component according to Embodiment 4 will be described with reference to a drawing.

The electronic component according to Embodiment 4 is required to have high heat resistance, and is, for example, a power device through which a large current reaching several hundred amperes flows. Such an electronic device is required to have heat resistance of about 200° C. In addition, a power semiconductor device made of SiC or GaN, which is a wide bandgap semiconductor, can operate at 300° C. or higher, so that module materials such as a connection material and a sealing material used to exhibit the operating ability of the power semiconductor device are also required to have high heat resistance.

Figure 11:
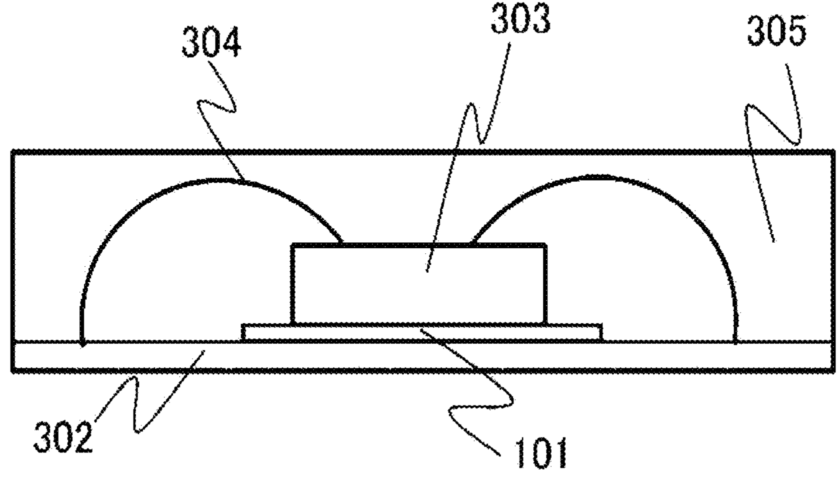
FIG. 11 is a cross-sectional view showing the structure of a semiconductor device which is an example of an electronic component according to Embodiment 4.

FIG. 11 shows a cross-sectional structure of a semiconductor device as the electronic component according to the present embodiment. In the semiconductor device, the stress relaxation type adhesive described in Embodiment 1 or 2 above is used for bonding constituent components thereof.

In the drawing, the semiconductor device has a semiconductor component 303 on a substrate 302, an electrode (not shown) of the semiconductor component 303 and an electrode (not shown) on the substrate 302 are connected by a wiring material 304 such as a wire, and the semiconductor component 303 is sealed by a sealing material 305. The semiconductor component 303 is bonded and mounted on the substrate 302 by the stress relaxation type adhesive 101.

The stress relaxation type adhesive 101 is not limited to the above, and the thermal conductivity thereof may be improved by adding an arbitrary amount of powder (scale-like, spherical, needle-like, and special shapes) of boron nitride, aluminum oxide, aluminum nitride, silver, or the like if necessary.

Also, as the substrate 302, a printed wiring board obtained by stacking glass prepreg materials in which epoxy is used, a ceramic substrate obtained by stacking and sintering ceramic layers, a lead frame molded by punching a thin pure copper plate, or the like may be used.

As described above, according to Embodiment 4, the electronic component has a member bonded by the stress relaxation type adhesive according to Embodiment 1 or 2 described above, and thus has high heat resistance. In addition, in the case where such an electronic component is incorporated into an apparatus, for example, a power conversion apparatus or the like and the apparatus is used for driving or controlling each device for an automobile, even if the apparatus is disposed in an environment having severe temperature changes, such as an engine room, the adhesive strength of the stress relaxation type adhesive 101 does not decrease, so that it is possible to maintain the reliability of the electronic component.

Embodiment 5

Hereinafter, an aircraft according to Embodiment 5 will be described with reference to a drawing.

Figure 12:
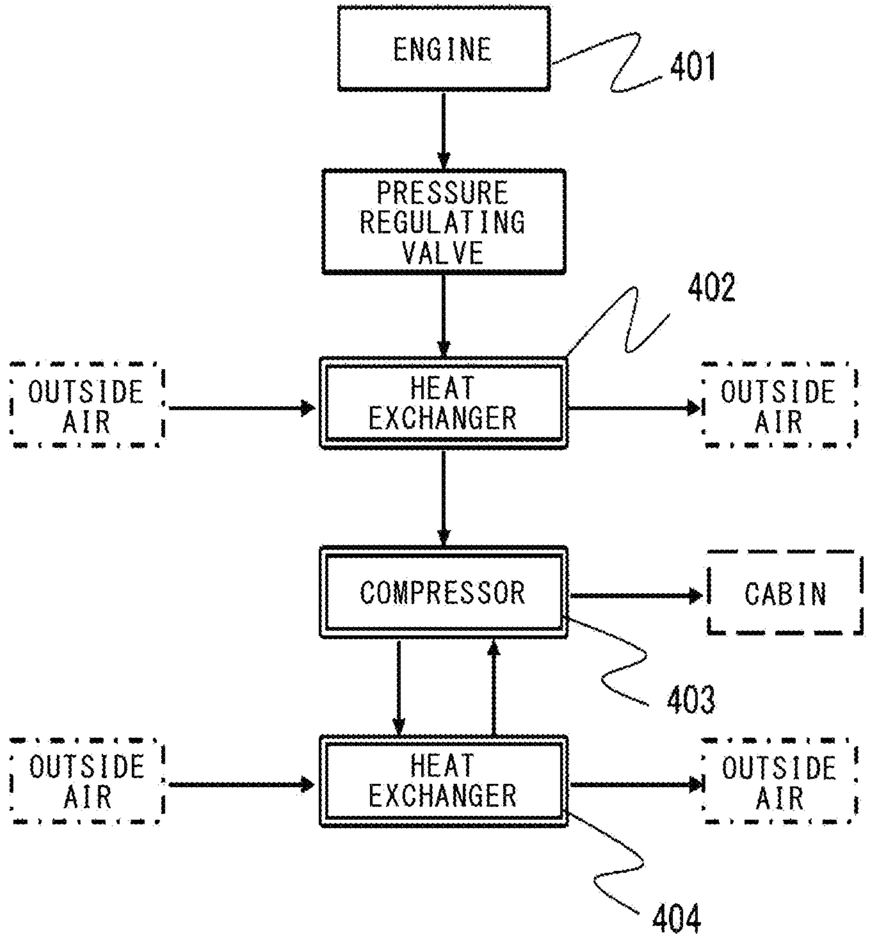
FIG. 12 is a block diagram showing the flow of air related to air conditioning in an aircraft according to Embodiment 5.

FIG. 12 is a block diagram showing the flow of air related to air conditioning in the aircraft according to Embodiment 5. A general jet engine 401 has a structure in which compressed air produced by a compressor from taken outside air is mixed with fuel in a combustion chamber and combusted intermittently. The temperature of air discharged from the combustion chamber is decreased to an arbitrary temperature by a heat exchanger 402 of each unit. Part of compressed air produced by a compressor 403 is taken thereinto and sent to an air conditioning system of the aircraft, and this air is cooled in the air conditioning system and blown into a cabin. In addition, air is taken into the compressor 403 directly through a heat exchanger 404 from outside air.

Here, the temperature of the air outside the aircraft is 0 to 40° C. on the ground, and −40 to 0° C. at an altitude of 10,000 m or higher. Therefore, it is assumed that components and sensors provided in the heat exchangers 402 and 404 and the compressor 403 used here are exposed to temperatures from a high temperature range of 100 to 200° C. due to the operation of the engine 401 to a low temperature of −40° C. Here, the heat exchanger 402 near a heat source close to the engine is required to have heat resistance of about 200° C., and the heat exchanger 404 and the compressor 403 are at a temperature lower than 200° C. but are also required to be usable at both high and low temperatures. The adhesive according to Embodiment 1 or 2 has high-temperature heat resistance, thus can be used at places such as the heat exchanger 402, and can be used for bonding the sensor components provided in the heat exchanger 404 and the compressor 403 if the temperature is about −10° C. to 130° C.

As described above, in the aircraft according to Embodiment 5, the constituent components, sensors, etc., included in the devices such as the heat exchangers and the compressor are bonded by the stress relaxation type adhesive 101 of Embodiment 1 or 2 described above, so that not only the high heat resistance but also the adhesive strength can be maintained even in environments from −40 to 200° C. Therefore, an aircraft equipped with a device having a highly reliable bonded portion between constituent components can be realized.

Other Embodiments (1) Stress Relaxation Agent

In Embodiments 1 to 5, the number of types of stress relaxation agents to be added is one, but when the stress relaxation agent is an ethylene-acrylic copolymer, the stress relaxation agent may be at least one selected from among ethylene dimethacrylate, hexamethylene diacrylate, tetramethylene dimethacrylate, diethylene glycol dimethacrylate, triethylene glycol dimethacrylate, tetraethylene glycol diacrylate, and 1,3-butylene glycol diacrylate.

Also, when the stress relaxation agent is an ethylene-propylene copolymer, the stress relaxation agent may be at least one selected from among propylene glycol diacrylate, tripropylene glycol diacrylate, 2-hydroxypropyl methacrylate, dipropylene glycol diacrylate, and tripropylene diacrylate.

A plurality of copolymers may be selected from among both the ethylene-acrylic copolymers and the ethylene-propylene copolymers described above as the stress relaxation agent.

(2) Surface Treatment

Although the surface treatment of the test piece of Embodiment 1 has been described, if surface treatment is performed when bonding the constituent components shown in Embodiments 3 to 5, the adhesive strength can be improved, that is, physical treatment such as atmospheric plasma treatment, deep ultraviolet light treatment, corona discharge treatment, and roughening treatment (laser roughening, grinding, sandblasting) is performed as pretreatment. In addition, as chemical treatment, a silane coupling agent is applied as a primer, whereby the same effect can also be obtained. For example, for the epoxy-based adhesive, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, N-2-(aminoethyl)-3-aminopropylmethyldimethoxysilane, 3-aminopropyltrimethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, etc., may be used as the primer.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 epoxy-based adhesive (base adhesive)

2 stress relaxation agent

3 filler

101 stress relaxation type adhesive

102 SPCC plate

103 cohesive failure mode

104 interface peeling mode

202 magnet

203 rotor core

204 shaft

302 substrate

303 semiconductor component

304 wiring material

305 sealing material

401 engine

402, 404 heat exchanger

403 compressor

The invention claimed is:

1. An adhesive wherein an epoxy-based base adhesive is formed with an epoxy compound having two or more allyl groups as functional groups, as a main agent, using an amine-based curing agent having a backbone include a bisphenol A resin, and at least one of an ethylene-acrylic copolymer and an ethylene-propylene copolymer each having an average particle diameter of 10 μm or less is contained as a stress relaxation agent in a range of 20 wt % or less with respect to the base adhesive.

2. The adhesive according to claim 1, wherein when the stress relaxation agent is the ethylene-acrylic copolymer, the stress relaxation agent is at least one selected from among ethylene dimethacrylate, hexamethylene diacrylate, tetramethylene dimethacrylate, diethylene glycol dimethacrylate, triethylene glycol dimethacrylate, tetraethylene glycol diacrylate, and 1,3-butylene glycol diacrylate, and when the stress relaxation agent is the ethylene-propylene copolymer, the stress relaxation agent is at least one selected from among propylene glycol diacrylate, tripropylene glycol diacrylate, 2-hydroxypropyl methacrylate, dipropylene glycol diacrylate, and tripropylene diacrylate.

3. The adhesive according to claim 1, wherein a filler is contained at a proportion of not less than 20 wt % and not greater than 85 wt % with respect to the base adhesive.

4. The adhesive according to claim 3, wherein the filler is at least one selected from among glass, mineral species composed of silicates, engineering polymer materials, ceramics, silver, and carbon.

5. A rotary electric machine comprising a member bonded by the adhesive according to claim 1.

6. An electronic component comprising a member bonded by the adhesive according to claim 1.

7. An aircraft comprising a constituent component bonded by the adhesive according to claim 1.

8. The adhesive according to claim 2, wherein a filler is contained at a proportion of not less than 20 wt % and not greater than 85 wt % with respect to the base adhesive.

9. The adhesive according to claim 8, wherein the filler is at least one selected from among glass, mineral species composed of silicates, engineering polymer materials, ceramics, silver, and carbon.

* * * * *